Sept. 29, 1970 G. J. JAROSZ 3,531,682

VERTICAL CONVERGENCE CIRCUIT

Filed Aug. 15, 1969

INVENTOR.
GEORGE J. JAROSZ

BY Hill, Sherman, Meroni, Gross & Simpson ATTORNEYS

United States Patent Office 3,531,682

Patented Sept. 29, 1970

3,531,682

VERTICAL CONVERGENCE CIRCUIT

George J. Jarosz, Chicago, Ill., assignor to Admiral Corporation, Chicago, Ill., a corporation of Delaware Filed Aug. 15, 1969, Ser. No. 850,438
Int. Cl. H01j 29/50
U.S. Cl. 315—13 10 Claims

ABSTRACT OF THE DISCLOSURE

A vertical convergence circuit having a single winding coupled to the vertical output transformer and having a pair of resistances coupled in parallel with the winding. One of the resistances has a coupling to the center tap of the red and green convergence coils, and the other resistance has a coupling to one end of the series combination of red and green coils. The red and green coils as a series combination have a resistance coupled in parallel therewith. A movable contact associated with the resistance is coupled to the center tap of the two convergence coils. The vertical output transformer has a pulse voltage coupled thereto from the prior stages of the television receiver, and the convergence winding integrates this pulse to form a sawtooth current. This sawtooth current is then applied differentially and in series to the convergence windings. Parabolic currents are also coupled to the coils through a master parabola amplitude control and through a differential amplitude parabola control which extends between the center tap of the convergence coils and the resistance which is in parallel with the convergence coils.

BACKGROUND OF THE INVENTION

Convergence coils in color television receivers are well known in the art, and circuits have been developed for applying parabolic and sawtooth currents to convergence coils to properly converge three beams in a color television receiver.

Vertical convergence circuits, however, in the past have utilized at least two windings which are coupled to the vertical output transformer in order to accomplish the desired convergence between the red and green convergence coils. One of the two windings has generally been usd as a master tilt control to couple sawtooth energy in series with the two convergence coils. The other winding has generally been used as a differential control. Such circuits, however, require an additional winding on the transformer which adds expense to the television receiver.

FIELD OF THE INVENTION

The field of art to which this invention pertains is vertical convergence circuits for a television receiver and in particular to convergence circuits for combining various proportions of parabola and sawtooth waveforms in a pair of series connected convergence coils.

SUMMARY OF THE INVENTION

It is an important feature of the present invention to provide an improved vertical convergence circuit for a color television receiver.

It is another feature of the present invention to provide a vertical convergence circuit for a color television receiver which is less expensive to produce than convergence circuits heretofore used.

It is a principal object of the present invention to provide a vertical convergence circuit for a pair of convergence coils which utilizes only a single winding on the vertical output transformer of a color television receiver.

It is also an object of the present invention to provide a vertical convergence circuit for a television receiver which utilizes a single winding on the vertical output transformer and which has a pair of resistors coupled in parallel therewith for controlling the degree of sawtooth delivered to the respective convergence coils.

It is also an object of the present invention to provide a convergence circuit for a color television receiver which utilizes a pair of series connected convergence coils and which has a resistance connected in parallel with both the coils and which utilizes a shunt contact from a point intermediate the two coils to the parallel resistance.

It is a further object of the present invention to provide a vertical convergence circuit as described above wherein the master tilt control and the differential tilt control for a pair of convergence coils are energized from a single winding on the vertical output transformer.

These and other objects, features and advantages of the invention will be readily apparent from the following description of a certain preferred embodiment thereof, taken in conjunction with the accompanying drawing, although variations and modifications may be effected without departing from the spirit and scope of the novel concepts of the disclosure.

DESCRIPTION OF THE PREFERRED EMBODIMENT

Figure 1:
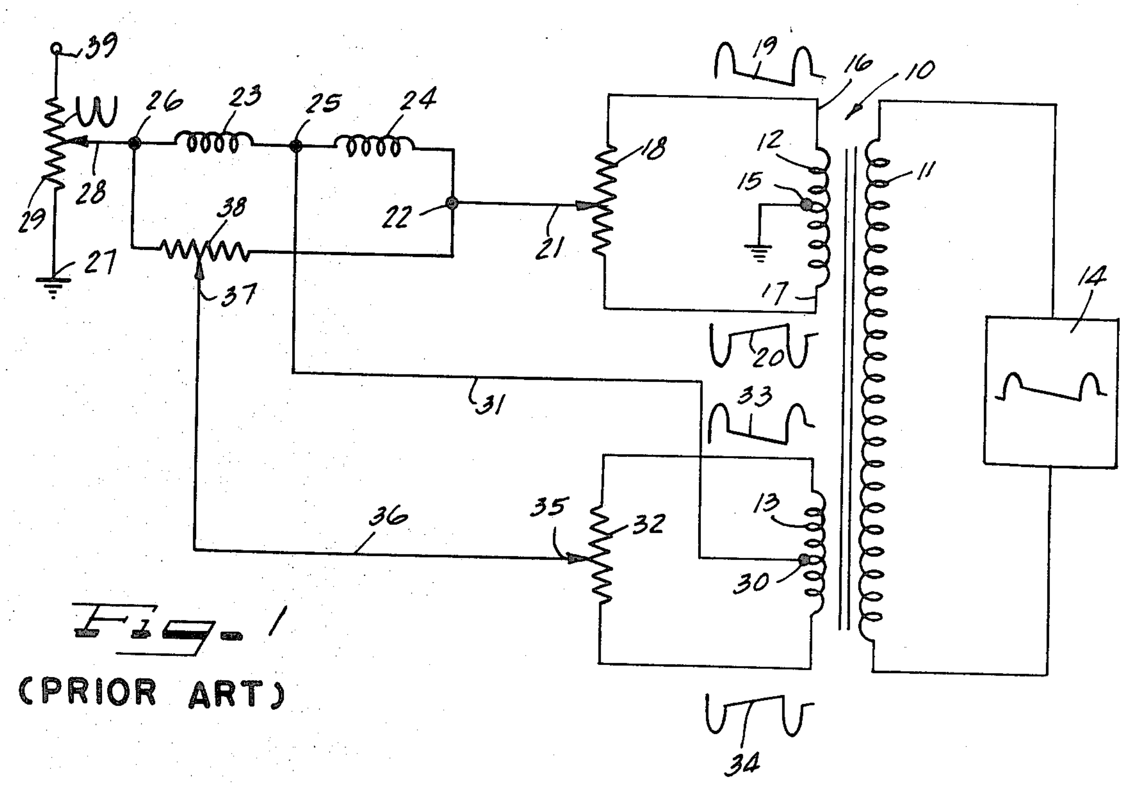
FIG. 1 (PRIOR ART)
FIG. 1 is a schematic of a prior art circuit of the type shown in the Schopp Pat. No. 3,114,858 showing a pair of windings coupled to the vertical output transformer and illustrating separate connections from the respective windings to the vertical convergence coils to control the differential and master tilt functions for the convergence coils.

The present invention significantly reduces the cost of prior vertical convergence circuits by eliminating one of two windings previously used on the vertical output transformer. Prior circuits have utilized one winding to couple sawtooth current to the convergence coils in a series relationship, and the other winding has been used to couple sawtooth current to the convergence coils in a differential relationship. In other words, one winding was used to supply energy to a potentiometer which in turn was employed to increase or decrease the overall amplitude of sawtooth current delivered to both the convergence coils, while the other coil was used as an energy source for a potentiometer which was used to control the relative proportion of sawtooth delivered to the respective convergence coils.

The prior art convergence circuits also control the differential amounts of parabolic current delivered to the respective convergence coils. This was achieved by coupling a sawtooth voltage to the resistor which was connected across the convergence coils. When integrated, the sawtooth voltage produced parabolic currents in the coils. By adjusting the movable tap on that resistor, the degree of parabolic current delivered to each of the coils could be proportioned. The entire operation was in the nature of a bridge circuit.

The present invention, however, eliminates the second winding on the vertical output transformer and utilizes a pair of resistors in parallel with the principal winding. One of these resistors is utilized to control the differential levels of sawtooth current in the convergence coils, and the other resistor is used to control the amplitude of sawtooth in both coils simultaneously.

In the present invention, the differential parabola control or the control which proportions the parabola between the two series connected convergence coils is accomplished by connecting the mid-point between the coils to a movable tap on a resistor which is coupled in parallel with the two coils. The master parabolic current control is provided by a separate source of parabolic energy and is coupled in series with both of the convergence coils.

Referring to the drawings in greater detail, a vertical output transformer 10 of a prior art circuit has a primary winding 11 and a pair of secondary windings 12 and 13.

The primary winding 11 is coupled to a source 14 of pulse energy at the vertical deflection frequency or frame frequency.

The secondary winding 12 is provided with a grounded center tap 15 and has a pair of terminals 16 and 17 which are coupled to a resistor 18.

The voltage waveforms developed across the secondary 12 are shown at 19 and 20. These waveforms are similar to the voltage waveform developed at the source 14.

The resistor 18 has a movable tap 21 associated therewith. The movable tap 21 is connected to a circuit point 22 which is at one end of a series combination of convergence coils 23 and 24. A center tap 25 is provided between the coils and a terminal 26 is provided at the opposite end of the coils. The terminal 26 is returned to ground at circuit point 27 through a movable tap 28 on a resistor 29.

The pulse voltage as shown at 19 and 20 is applied by means of the movable tap 21 across the convergence coils 23 and 24. This pulse of voltage is integrated into a sawtooth of current in the convergence coils. Since the movable contact 21 is connected in series with the coils 23 and 24, the contact 21 acts as a master tilt control for the convergence coils.

The second winding 13 coupled to the vertical output transformer 10 has a center tap 30 which is coupled through a circuit line 31 to the center tap 25 of the convergence coils 23 and 24.

The winding 13 also has a resistor 32 connected in parallel therewith. As in the case of the winding 12, the winding 13 has voltage pulse information 33 and 34 developed thereacross. This voltage pulse information is coupled through a movable contact 35 and a circuit line 36 to a movable contact 37 on a resistor 38.

The resistor 38 is coupled in parallel with the series combination of convergence coils 23 and 24.

From studying FIG. 1, it can be seen that the voltage between the circuit points 30 and 35 is coupled across the circuit points 25 and 37. Therefor by moving the position of the movable tap 35, the proportion of sawtooth current delivered to the respective convergence coils 23 and 24 can be altered.

A source of parabolic current is indicated generally by reference numeral 39 and is coupled through the resistor 29 to circuit ground at 27. Accordingly, by adjusting the position of the movable contact 28, the amplitude of the parabolic current delivered through the coils 23 and 24 can be varied. Also, by moving the position of the contact 37, the proportion of parabolic current delivered to the respective coils 23 and 24 can be adjusted.

The vertical convergence circuit shown in FIG. 1 therefore utilizes a pair of windings on the vertical output transformer to accomplish the required control of the sawtooth and parabolic currents delivered to the convergence windings.

Figure 2:
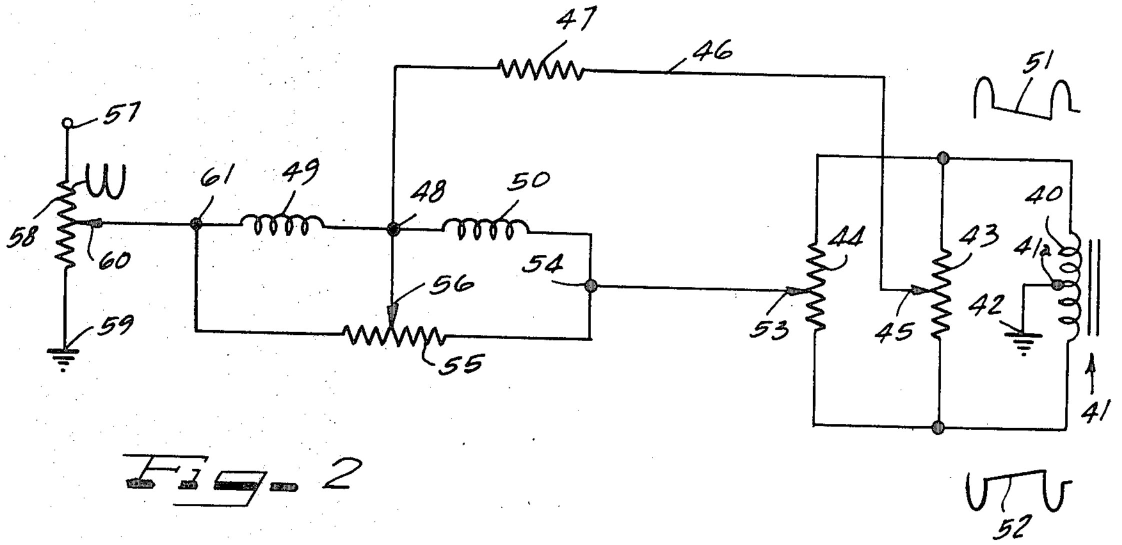
FIG. 2 is a schematic of the circuit of the present invention showing a single winding on the vertical output transformer and illustrating the pair of resistances coupled in parallel with the single winding to control both the master tilt and the differential tilt functions for the convergence coils.

The present invention as shown in FIG. 2, however, utilizes only a single convergence winding 40 associated with the vertical output transformer 41.

The single convergence winding 40 has a center tap 41*a* which is grounded as at 42. Also, the coil 40 has a pair of resistors 43 and 44 coupled in parallel therewith. The resistor 43 has a movable tap 45 associated therewith and coupled through a circuit line 46 and a resistor 47 to a circuit point 48 intermediate the two convergence coils 49 and 50.

The convergence winding 40 has waveforms 51 and 52 similar to the voltage waveforms 19 and 20 developed thereacross. The pulse-like waveforms -51 and 52 are coupled to the circuit point 48 between the coils 49 and 50, and accordingly develops sawtooth currents within the respective convergence coils which can be increased or decreased by varying the position of the movable tap 45. Accordingly, the movable tap 45 acts as a differential tilt control for the coils 49 and 50.

The resistor 44 also has a movable tap 53 associated therewith for coupling energy from the resistor 44 to a circuit point 54 at one end of the series combination of convergence coils 49 and 50. Accordingly, the contact 53 acts as a master tilt control for the circuit by coupling pulse energy to the respective coils. As explained, this pulse energy is integrated in the coils to develop sawtooth currents as required.

The convergence coils 49 and 50 have a resistor 55 coupled thereacross, and a movable contact 56 extends from the resistor 55 to the circuit point 48 intermediate the coils 49 and 50.

A source of parabolic current is indicated generally by the numeral 57. The circuit point 57 is connected through a resistor 58 to circuit ground as at 59.

The resistor 58 has a movable tap 60 associated therewith for coupling current therefrom to a circuit point 61 which is in series with the two convergence coils 49 and 50. Accordingly, as in the circuit of FIG. 1, the contact 60 acts as a master parabola control for the convergence coils. However, in the present invention, the movable contact 56 acts as a differential parabola control for the two coils.

It can be seen, therefor, that the circuit of FIG. 2 accomplishes all of the functions of FIG. 1 while eliminating the requirement for a second winding on the vertical output transformer and greatly reducing the complexity of the convergence circuit.

I claim as my invention:

1. A convergence circuit comprising:

first and second convergence coils coupled in series,
a transformer having a primary and a secondary winding,
first and second impedance elements coupled in parallel with the secondary of said transformer,
first means coupling energy from one of said impedance elements into a series path with said convergence coils, and
means coupling energy from the other one of said impedance elements into parallel paths with said convergence coils.

2. A convergence circuit in accordance with claim 1 wherein said first and second impedance elements comprise first and second resistors and wherein said first and second coupling means comprises first and second movable taps on said respective resistors.

3. A convergence circuit in accordance with claim 1 wherein a resistor is coupled in parallel with said first and second convergence coils and wherein means are provided to couple a point intermediate said convergence coils to a point on said resistor.

4. A convergence circuit in accordance with claim 3 wherein said means comprises an adjustable tap on said resistor.

5. A convergence circuit comprising:

first and second convergence coils coupled in series,
a transformer having a primary and a secondary winding,
means for coupling pulse energy to the primary of said transformer,
first and second resistors coupled in parallel with the secondary of said transformer,
said first and second resistors developing a substantial sawtooth of current therethrough,
means for coupling the sawtooth of current from one of said resistors to a point intermediate said convergence coils, and means for coupling the sawtooth of current from the other of said resistors to one end of the series combination of said convergence coils.

6. A convergence circuit in accordance with claim 5 wherein a resistor is coupled in parallel with said convergence coils and wherein a movable tap on said resistor extends to a point intermediate said convergence coils.

7. A convergence circuit in accordance with claim 6 wherein a source of parabolic current is coupled in series with both of said series connected resistors.

8. A convergence circuit in accordance with claim 7 wherein said source of parabolic current is coupled to the end of said series combination of convergence coils oppositely of said one end having the sawtooth current coupled thereto.

9. In a color television receiver having a pair of series connected convergence coils for converging a plurality of electron beams in the vertical direction and having a vertical output transformer for supplying energy to the convergence coils at the vertical deflection rate, a winding inductively coupled to said vertical output transformer and having first and second impedance elements each coupled in parallel therewith and each developing sawtooth currents therein, a variable tap associates with each of said resistors, one of said variable taps being coupled to a point intermediate said convergence coils to supply a differential tilt control for said coils, and the other of said variable taps being coupled to one end of the series combination of said convergence coils to provide a master tilt control thereby.

10. A convergence circuit in accordance with claim 9 wherein means are provided to supply parabolic current to said coils, wherein a master parabola control is provided thereon, a further resistor coupled in parallel with said convergence coils, and a movable tap on said further resistor is coupled to a point intermediate said convergence coils to provide a differential parabola control for said coils.

References Cited

UNITED STATES PATENTS

| | | |
|---|---|---|
| 2,987,646 | 6/1961 | Zucker. |
| 3,163,797 | 12/1964 | Singleback. |
| 3,422,303 | 1/1969 | Chipman. |

RODNEY D. BENNETT, Jr., Primary Examiner

M. F. HUBLER, Assistant Examiner